United States Patent [19]

Enami et al.

[11] Patent Number: 5,548,038
[45] Date of Patent: Aug. 20, 1996

[54] ORGANOSILOXANE COMPOSITIONS YIELDING OPTICALLY CLEAR, NON-YELLOWING ORGANOSILOXANE GELS

[75] Inventors: Hiroji Enami; Takeaki Saiki, both of Chiba Prefecture, Japan

[73] Assignee: Dow Corning Toray Silicone Co., Ltd., Tokyo, Japan

[21] Appl. No.: 404,405

[22] Filed: Mar. 14, 1995

[30] Foreign Application Priority Data

Mar. 31, 1994 [JP] Japan ................................. 6-087992

[51] Int. Cl.⁶ ................................................. C08F 283/00
[52] U.S. Cl. ........................................... 525/478; 528/15
[58] Field of Search ............................... 525/478; 528/15

[56] References Cited

U.S. PATENT DOCUMENTS

| | | | |
|---|---|---|---|
| 4,122,246 | 10/1978 | Sierawski | 528/15 |
| 5,086,147 | 2/1992 | Ikeno et al. | 528/15 |
| 5,362,781 | 11/1994 | Stein | 525/478 |
| 5,366,809 | 11/1994 | Schmidt et al. | 525/478 |
| 5,371,163 | 12/1994 | Wilson | 525/478 |
| 5,373,078 | 12/1994 | Juen et al. | 525/478 |

FOREIGN PATENT DOCUMENTS

| | | |
|---|---|---|
| 2800652 | 1/1978 | Germany . |
| 62-0039659 | 2/1987 | Japan . |
| 62-0039660 | 2/1987 | Japan . |
| 62-0181357 | 8/1987 | Japan . |

*Primary Examiner*—Melvyn I. Marquis
*Attorney, Agent, or Firm*—Robert Spector

[57] ABSTRACT

The present invention provides organosiloxane compositions that cure to optically transparent gels by a hydrosilation reaction and contain a) two types of alkenyl-substituted organopolysiloxanes, and b) a diorganopolysiloxane containing an average of at least two silicon-bonded hydrogen atoms per molecule that are located on non-terminal silicon atoms. The molar ratio of silicon-bonded hydrogen atoms to alkenyl radicals in the composition is from 0.1 to 1.2.

4 Claims, No Drawings

5,548,038

ORGANOSILOXANE COMPOSITIONS YIELDING OPTICALLY CLEAR, NON-YELLOWING ORGANOSILOXANE GELS

BACKGROUND OF THE INVENTION

1. Field of the Invention

This invention relates to curable organosiloxane compositions yielding gels suitable for use in optical filling applications. More particularly, this invention relates to organosiloxane compositions that cure to yield highly transparent gels exhibiting little timewise decline in visible light transmittance at elevated temperatures and that do not crack when subjected to thermal shocks.

2. Background Information

Organosiloxane compositions that cure by a hydrosilation reaction to produce highly transparent silicone gels are used as the optical-filling material between solar battery cells and the encasing plastic or glass and as optical-filling material between liquid-crystal display devices and the encasing plastic or glass.

At elevated temperatures, however, the silicone gels that cure by a hydrosilation reaction undergo a reduction in their visible light transmittance with the passage of time. As a result, optical components fabricated using these silicone gels exhibit a very low reliability at elevated temperatures. This problem is already known to be strongly influenced by the platinum compound added to the silicone gel compositions as catalyst, and by the ratio between the number of moles of silicon-bonded hydrogen atoms and the number of moles of alkenyl radicals that participate in the curing of these silicone gels. This knowledge has resulted in such tactics as, for example, (i) drastically reducing the concentration of platinum compound in curable organosiloxane composition used to prepare the gel to a level at which only a negligible timewise decline in visible light transmittance is exhibited by the resulting silicone gel at elevated temperatures, and (ii) the use of a large molar excess of silicon bonded hydrogen atoms with respect to alkenyl radicals in the curable composition. Unfortunately, these tactics are themselves associated with several problems. These problems include retardation of curing of the organosiloxane composition, an increase in the hardness of the resulting silicone gel with the passage of time, and foaming of the organosiloxane composition during the course of its cure.

There have also been various other proposals directed at inhibiting the high-temperature timewise decay in visible light transmittance by silicone gels cured by a hydrosilation reaction. For example, Japanese Laid Open Patent Application [Kokai or Unexamined] Number Sho 54-48720 [48,720/1979] describes an organosiloxane composition consisting of an organopolysiloxane having on average approximately 2 silicon-bonded vinyl groups in each molecule, an organopolysiloxane containing an average of at least 3 SiH in each molecule, an organopolysiloxane having in each molecule at least 1 silicon-bonded hydroxyl and at least 2 silicon-bonded vinyl groups, and a silane containing at least 1 epoxy-functional organic group and at least 1 silicon-bonded alkoxy group, and a platinum compound.

Japanese Laid Open Patent Application Number Sho 54-101884 [101,884/1979] describes an organosiloxane composition curable to a gel that consists of an alkenyl-endblocked diorganopolysiloxane (unless specified otherwise, here and below the term "endblocking" refers to both terminal positions of the molecule), an organopolysiloxane containing at least 2 SiH in each molecule, and a platinum compound.

Japanese Laid Open Patent Application Number Sho 62-39659 [39,659/1987] describes an organosiloxane composition curable to a gel. The composition contains an organopolysiloxane containing an average of from 0.1 to 2.0 silicon-bonded vinyl radicals in each molecule, an organohydrogenpolysiloxane containing an average of more than 2 SiH in each molecule, an organohydrogenpolysiloxane containing an average of less than 2 SiH in each molecule, and a platinum compound.

Japanese Laid Open Patent Application Number Sho 62-39660 [39,660/1987] teaches a composition curable to a silicone gel. The composition comprises an organopolysiloxane containing an average of from 0.1 to 2.0 silicon-bonded vinyl radicals in each molecule, a tris(dialkylhydrogensiloxy)-organosilane, and a platinum compound.

Japanese Laid Patent Application Laid Open Number Sho 62-181357 [181,357/1987] discloses a gel-forming curable organosiloxane composition containing a platinum compound, SiH-endblocked diorganopolysiloxane, vinyl-endblocked diorganopolysiloxane, and organopolysiloxane composed of the dimethylsiloxane, methylsiloxane, trimethylsiloxy, and dimethylvinylsiloxane units.

Japanese Laid Open Patent Application Number Hei 3-56565 [56,565/1991] teaches a gel-forming organosiloxane composition containing an alkenyl-functional organopolysiloxane, an organohydrogenpolysiloxane containing in each molecule on average 1 alkenyl group and 1 SiH, and a platinum compound.

Gels prepared using the organosiloxane compositions described in the preceding paragraphs still do not exhibit a satisfactory inhibition of the high-temperature timewise decline in visible light transmittance. These curable compositions also suffer from another problem. The compositions are being used in narrow gaps due to the present trend of using smaller amounts of the composition to fill the space between solar battery cells and the encasing plastic or glass and between liquid-crystal display devices and the encasing plastic or glass. However, under these conditions the silicone gels obtained from the prior art organosiloxane compositions described in the preceding paragraphs undergo cracking when subjected to thermal shock.

The present invention was achieved as a result of extensive research directed at solving the problems described in the preceding sections of this specification. In specific terms, one objective of this invention is to provide curable organosiloxane compositions that cure to yield optically transparent gels suitable for use as fillers exhibiting little timewise decline in visible light transmittance at elevated temperatures and which do not crack when exposed to thermal shock.

SUMMARY OF THE INVENTION

The objectives of this invention are achieved by providing organosiloxane compositions that cure to yield optically transparent gels by a hydrosilation reaction. The compositions contain two types of alkenyl-substituted organopolysiloxanes, and a diorganopolysiloxane containing an average of at least two silicon-bonded hydrogen atoms per molecule that are located on non-terminal silicon atoms. The molar ratio of silicon-bonded hydrogen atoms to alkenyl radicals in the composition is from 0.1 to 1.2. The gels retain their optical properties following exposure to 120° C. for extended periods of time.

DETAILED DESCRIPTION OF THE INVENTION

The present invention provides a curable organosiloxane composition that cures to yield a gel, said composition comprising
(A) 100 parts by weight of a first diorganopolysiloxane containing at least 1 silicon-bonded alkenyl group in each molecule and exhibiting a viscosity at 25° C. of 50 to 100,000 centipoise 0.05° to 100° C.,
(B) from 1 to 100 parts by weight of an organopolysiloxane exhibiting the average unit formula $$(R^1{}_3SiO_{1/2})_a(R^1{}_2R^2SiO_{1/2})_b(SiO_{4/2})_c$$

wherein $R^1$ represents a monovalent hydrocarbon radical, with groups excluding alkenyl groups, $R^2$ represents alkenyl groups, a is 0 or a positive number, b is a positive number, c is a positive number, and (a+b)/c is 0.6 to 4.0,
(C) a second diorganopolysiloxane exhibiting a viscosity at 25° C. of from 1 to 1,000,000 centipoise (0.001 to 1000 Pa.s) and containing at least two silicon-bonded hydrogen atoms per molecule, wherein said hydrogen atoms are present only on non-terminal silicon atoms in each molecule and the molar ratio of silicon-bonded hydrogen atoms in said second diorganopolysiloxane to alkenyl radicals in ingredients A and B is from 0.1 to 1.2, inclusive; and
(D) a quantity of a platinum compound sufficient to promote curing of said composition,
wherein said gel has a penetration of from 20 to 200, inclusive, measured using a one-quarter scale cone in accordance with Japanese Industrial Standard (JIS) K 2220.

The gel-forming organosiloxane compositions of this invention are explained in detail in the following sections of this specification.

The Crosslinkable Organopolysiloxane (Ingredient A)

Ingredient A is the base ingredient of the present compositions and comprises at least one diorganopolysiloxane containing at least one silicon-bonded alkenyl radical in each molecule. The silicon-bonded alkenyl radical(s) in ingredient (A) are specifically exemplified by vinyl, allyl, butenyl, pentenyl, hexenyl, and heptenyl, with vinyl being preferred.

The bonding position of the alkenyl radical in ingredient (A) is not critical, and this radical may be bonded to terminal and/or non-terminal silicon atoms in the molecule.

The silicon bonded hydrocarbon radicals other than alkenyl in ingredient A are specifically exemplified by but not limited to alkyl radicals such as methyl, ethyl, propyl, butyl, pentyl, and hexyl; cycloalkyl groups such as cyclopentyl and cyclohexyl; aryl radicals such as phenyl, tolyl, xylyl, and naphthyl; aralkyl radicals such as benzyl and phenethyl; and haloalkyl groups such as 3,3,3-trifluoropropyl and 3-chloropropyl. Methyl and phenyl radicals are preferred.

Ingredient A has a straight-chain molecular structure, however its main chain may be partially branched. The diorganosiloxanes that constitute ingredient A are specifically exemplified by dimethylpolysiloxanes containing a dimethylvinylsiloxy group at one terminal position and a trimethylsiloxy group at the other terminal position; dimethylsiloxane-methylvinylsiloxane copolymers containing a dimethylvinylsiloxy group at one terminal position and a trimethylsiloxy group at the other terminal position; dimethylvinylsiloxy-endblocked dimethylpolysiloxanes trimethylsiloxy-endblocked methylvinylpolysiloxanes, trimethylsiloxy-endblocked dimethylsiloxane-methylvinylsiloxane copolymers, and trimethylsiloxy-endblocked dimethylsiloxane-methylvinylsiloxane-methylphenylsiloxane copolymers.

Dimethylvinylsiloxy-endblocked dimethylpolysiloxanes are preferred.

Ingredient A must have a viscosity at 25° C. of from 50 to 100,000 centipoise (0.05 to 100 Pa.s), preferably from 100 to 50,000 centipoise (0.1 to 50 Pa.s). The cured silicone gel will be brittle when ingredient A has a viscosity at 25° C. below 50 centipoise (0.05 Pa.s).

When the viscosity of ingredient A at 25° C. is in excess 100,000 centipoise (100 Pa.s) the viscosity of the curable composition is to high, which substantially decreases the handling and workability of the composition.

The Organosiloxane Copolymer (Ingredient B)

Ingredient B is a characterizing feature of the present compositions, and consists essentially of an organosiloxane copolymer with the following average formula.

$$(R^1{}_3SiO_{1/2})_a(R^1{}_2R^2SiO_{1/2})_b(SiO_{4/2})_c$$

Each $R^1$ in the preceding formula represents a monovalent hydrocarbon radical excluding alkenyl radicals, and $R^2$ represents an alkenyl radical. $R^1$ is specifically exemplified by but not limited to the same group of hydrocarbon radicals discussed in connection with ingredient A. Methyl and phenyl are preferred hydrocarbon radicals.

The substituent represented by $R^2$ is specifically exemplified by vinyl, allyl, butenyl, pentenyl, hexenyl, and heptenyl, wherein vinyl is preferred. The subscript a in the preceding formula is zero or a positive number, the subscript b is a positive number, the subscript c is a positive number, and (a+b)/c is 0.6 to 4.0. Ingredient B has a very reduced compatibility with ingredient A when the values of (a+b)/c is below 0.6, with the result that the ultimately produced silicone gel will be opaque. Organopolysiloxane copolymers wherein this value exceeds 4.0 do not exist.

The consistency of ingredient B can range from a solid to a liquid at room temperature. When ingredient B is a solid at room temperature, it is preferably dissolved in ingredient A prior to being blended with the other ingredients of the present composition.

The concentration of ingredient B is from 1 to 100 parts by weight per 100 parts by weight ingredient A, preferably from 10 to 50 parts by weight per 100 parts by weight ingredient (A). The high-temperature timewise decay in the visible light transmittance of the silicone gel product cannot be prevented when the concentration of ingredient B is less than 1 parts by weight per 100 parts by weight of ingredient A.

The addition of more than 100 parts by weight of ingredient B per 100 parts of ingredient A imparts a high viscosity to the present composition and substantially degrades the composition's handling and workability.

The Crosslinking Agent (Ingredient C)

Ingredient C is a crosslinker that causes curing of the present compositions by a hydrosilation reaction involving the silicon-bonded hydrogen atoms in ingredient C with the alkenyl radicals in ingredients A and B in the presence of the platinum compound that constitutes ingredient D. Ingredient C, also referred to in this specification as the "second diorganopolysiloxane" is a diorganopolysiloxane containing at least 2 silicon-bonded hydrogen atoms in each molecule, wherein said silicon-bonded hydrogen atoms are bonded only to non-terminal silicon atoms.

The silicon-bonded organic groups in ingredient C are hydrocarbon radicals that include but are not limited to alkyl radicals such as methyl, ethyl, propyl, butyl, pentyl and hexyl; cycloalkyl radicals such as cyclopentyl and cyclohexyl; aryl radicals such as phenyl, tolyl, xylyl and naphthyl; aralkyl groups such as benzyl and phenethyl; and haloalkyl radicals such as 3,3,3-trifluoropropyl and 3-chloropropyl. Methyl and phenyl are the preferred hydrocarbon radicals.

Ingredient C has a straight-chain molecular structure, but its main chain may be partially branched. Ingredient C is specifically exemplified by trimethylsiloxy-endblocked dimethylsiloxane-methylhydrogensiloxane copolymers, trimethylsiloxy-endblocked methylhydrogenpolysiloxanes, and trimethylsiloxy-endblocked dimethylsiloxane-methylhydrogensiloxane-methylphenylsiloxane copolymers. Trimethylsiloxy-endblocked dimethylsiloxane-methylhydrogensiloxane copolymer is preferred.

Ingredient C must have a viscosity at 25° C. of from 1 to 1,000,000 centipoise (0.001 to 1,000 Pa.s), preferably from 3 to 10,000 centipoise (0.003 to 10 Pa.s). Evaporation of ingredient (C) readily occurs when ingredient (C) has a viscosity at 25° C. below 1 centipoise (0.001 Pa.s), making the curable organosiloxane composition unstable.

At the other end of the range, a viscosity in excess of 1,000,000 centipoise (1,000 Pa.s) imparts a high viscosity to the curable organosiloxane composition, degrading the composition's handling and workability.

The concentration of ingredient C in the present compositions is sufficient to provide a molar ratio of from 0.1:1 to 1.2:1 for the ratio of silicon-bonded hydrogen in ingredient C to the total number of moles of alkenyl radicals in ingredients A and B. This ratio is preferably from 0.1:1 to 0.5:1. The organosiloxane composition will not cure properly when this ratio is less than 0.1:1. At values above 1.2:1, the cured silicone gel will exhibit a timewise decline in visible light transmittance at elevated temperatures and will crack when subjected to thermal shock.

The Platinum-Containing Catalyst (Ingredient D)

Ingredient D of the present compositions is a platinum compound that accelerates curing of the compositions. Ingredient D is specifically exemplified by chloroplatinic acid/olefin complexes and by complexes between chloroplatinic acid and siloxane such as divinyltetramethyldisiloxane.

Ingredient D should be added in a catalytic quantity, but its quantity of addition is not otherwise critical. The concentration of this ingredient is preferably equivalent to from 0.01 to 1,000 parts by weight, preferably from 0.1 to 100 parts by weight, of platinum metal per 1,000,000 parts of the combined weights of ingredients (A), (B), and (C).

It is difficult to obtain a rapid cure of the instant composition at concentrations equivalent to less than 0.01 part by weight of platinum metal per 1,000,000 parts by weight of the combined weights of ingredients (A), (B), and (C). Catalyst concentrations equivalent to more than 1000 parts by weight platinum metal on the same basis are uneconomical.

In addition to ingredients A, B, C, and D described in the preceding paragraphs, the present compositions can contain various fillers in order to adjust the viscosity of the composition and/or improve the mechanical strength of the cured silicone gel, so long as these fillers do not adversely affect the objectives of the present invention. Suitable fillers include but are not limited to reinforcing fillers such as fumed silica and fumed silica that has been surface treated with an organosilicon compound such as methyltrimethoxysilane, vinyltrimethoxysilane, trimethylchlorosilane, dimethyldichlorosilane, hexamethyldisilazane, alpha,omega-dimethylhydroxysiloxy- endblocked dimethylsiloxane oligomer, alpha,omega-dimethylhydroxysiloxy-endblocked methylvinylsiloxane oligomer, alpha,omega-dimethylhydroxysiloxy-endblocked methylphenylsiloxane oligomer, and diphenylsilanediol.

In order to regulate the cure rate and/or improve the storage stability of the present compositions, small or very small amounts of one or more of the following compounds may be added as cure inhibitors insofar as the object of the present invention is not impaired: acetylenic compounds such as 3-methyl-1-butyn-3-ol, 3,5-dimethyl-1-hexyn-3-ol, and phenylbutynol; ene/yne compounds such as 3-methyl-3-penten-1-yne, 3,5-dimethyl-3-hexen-1-yne; alkenylsiloxane compounds such as 1,3,5,7-tetramethyl-1,3,5,7-tetravinylcyclotetrasiloxane, and 1,3,5,7-tetramethyl-1,3,5,7-tetrahexenyltetracyclosiloxane; triazole compounds such as benzotriazole; phosphine compounds and mercapto compounds.

The cured silicone gel obtained from the present compositions must have a penetration values in the range from 20 to 200, inclusive, measured using a penetrometer equipped with a one-quarter scale cone as described in Japan Industrial Standard (JIS) K 2220. The preferred range for this penetration value is from 30 to 150.

When used in narrow gaps, a cured silicone gel with a quarter-scale cone penetration value below 20 will crack under thermal shock challenge. Vibration ultimately causes silicone gels with quarter-scale cone penetration values above 200 to flow.

Optical-filling cured silicone gels according to the present invention are prepared by mixing ingredients A B, C and D of the present compositions, together with any optional ingredients, to homogeneity. No particular restrictions apply to the equipment used to prepare the curable compositions of this invention, which include but are not limited to Hobart mixers, Ross mixers, and planetary mixers.

The compositions of the present invention can be cured at room temperature or by heating, and in this manner can be used as an optical filler or adhesive. The present compositions are particularly suitable for filling the space between the encasing, supporting, or framing plastic or glass and the liquid-crystal display element of a liquid-crystal projector, liquid-crystal television, liquid-crystal display, or other liquid crystal device; as filling material between the encasing, supporting, or framing plastic or glass and a fluorescent display tube; and as filling material between a solar battery cell and the encasing, supporting, or framing plastic or glass.

EXAMPLES

The following examples describe preferred curable compositions and cured gels of the present invention, and should not be interpreted as limiting the scope of the present invention as defined in the accompanying claims. Unless otherwise specified, all parts and percentages in the examples are by weight and viscosities are the values measured at 25° C.

The penetration values, color, visible light transmittance, high-temperature timewise change in the preceding properties, and cracking under thermal shock challenge were measured on the cured gels using the following methods.

One-Quarter Scale Cone Penetration Values

The curable organosiloxane composition to be evaluated was poured into a 50 mL beaker. The composition was deaired and then heated for 30 minutes at 80° C. The penetration value of the resultant cured silicone gel was measured using a penetrometer equipped with a one-quarter scale cone in accordance with the method described in JIS K 2220. The silicone gel was then held in the beaker for 1 week at 120° C. The penetration was again measured on the silicone gel using the same method in order to determine the timewise change in penetration.

Color of the Silicone Gels

The curable organosiloxane composition to be evaluated was poured into a quartz cell (10 mm×40 mm×45 mm, transmission length=10 mm), deaired, and then heated at 80° C. for 30 minutes to yield a silicone gel in the quartz cell. The color of the gel was then inspected visually. The silicone gel was allowed to remain undisturbed in the quartz cell for 1 week at 120° C. At the end of this period the color of the gel was again evaluated as before in order to determine the timewise change in color.

Visible Light Transmittance of the Silicone Gels

The curable organosiloxane composition to be evaluated was poured into a quartz cell (10 mm×40 mm×45 mm, transmission length=10 mm), deaired, and heated at 80° C. for 30 minutes to yield a silicone gel in the quartz cell. The visible light transmittance of the silicone gel was measured at a wavelength of 400 nm using a spectrophotometer and pure water as the control. The cured gel was allowed to remain in the quartz cell for 1 week at 120° C. The visible light transmittance of the gel was then measured again using the same method in order to determine the timewise change in visible light transmittance.

Thermal Shock Resistance of the Silicone Gels

A gap was established between two glass plates using 2-mm thick spacers, and the curable organosiloxane composition to be evaluated was injected into this gap. A test sample of cured gel was prepared by deairing the composition and heating for it 30 minutes at 80° C. The cured gel was subjected to 100 cycles of thermal shock testing (120° C. for 30 minutes, followed by storage at room temperature for 30 minutes, followed by exposure to −20° C. for 30 minutes). The gel was then examined to determine the presence or absence of cracks.

EXAMPLE 1

A curable composition of the present invention was prepared by mixing the following ingredients to homogeneity: 100.0 parts by weight of a dimethylvinylsiloxy-endblocked dimethylpolysiloxane exhibiting a viscosity of 2,000 centipoise (2 Pa.s) and a vinyl content of 0.23 weight %; 25.0 parts by weight of an organopolysiloxane with the following average formula and a vinyl content of 1.85 weight %

$[(CH_3)_3SiO_{1/2}]_{39.7}[(CH_3)_2(CH_2=CH)SiO_{1/2}]_{4.8}(SiO_{4/2})_{55.5};$ 1.3 parts by weight of a trimethylsiloxy-endblocked methylhydrogensiloxane-dimethylsiloxane copolymer with a viscosity of 5 centipoise (0.005 Pa.s), a molar ratio of methylhydrogensiloxane to dimethylsiloxane units of 5:3, and a silicon-bonded hydrogen content of 0.73 weight %;

0.3 parts by weight of a chloroplatinic acid/divinyltetramethyl-disiloxane complex exhibiting a platinum content=0.5 weight %; and 0.6 part by weight of 3-phenyl-1-butyn-3-ol.

The properties of the silicone gel obtained by curing this composition were measured by the methods described above, and the results are reported in Table 1.

EXAMPLE 2

A cured gel of the present invention was prepared by blending the following ingredients to homogeneity: 27.0 parts by weight of dimethylvinylsiloxy-endblocked dimethylpolysiloxane exhibiting a viscosity of 400 centipoise, (0.4 Pa.s) and a vinyl content of 0.48 weight percent; 73.0 parts by weight of a dimethylvinylsiloxy-endblocked dimethylpolysiloxane exhibiting a viscosity of 2,000 centipoise (2 Pa.s) and a vinyl content of 0.23 weight %); 21.6 parts by weight of a organosiloxane copolymer with the following average formula and a vinyl content of 1.85 weight percent $[(CH_3)_3SiO_{1/2}]_{39.7}[(CH_3)_2(CH_2=CH)SiO_{1/2}]_{4.8}(SiO_{4/2})_{55.5};$ 1.2 parts by weight trimethylsiloxy-endblocked methylhydrogensiloxane-dimethylsiloxane copolymer with a viscosity of 5 centipoise and a molar ratio of methylhydrogensiloxane: dimethylsiloxane units of 5:3 and a silicon-bonded hydrogen content of 0.73 weight %; 0.3 part by weight of a chloroplatinic acid/divinyltetramethyldisiloxane complex containing 0.5 weight percent of platinum; and 0.7 part by weight of 3-phenyl-1-butyn-3-ol.

The properties of the silicone gel afforded by the cure of this composition were measured by the methods described above, and the results are reported in Table 1.

EXAMPLE 3

An optical-filling silicone gel composition according to the invention was prepared by blending the following ingredients to homogeneity: 45.5 parts by weight of a dimethylvinylsiloxy-endblocked dimethylpolysiloxane exhibiting a viscosity of 400 centipoise (0.4 Pa.s) and a vinyl content of 0.48 weight %; 54.5 parts by weight of a dimethylvinylsiloxy-endblocked dimethylpolysiloxane exhibiting a viscosity of 2,000 centipoise (2 Pa.s) and a vinyl content of 0.23 weight percent; 13.6 parts by weight of an organopolysiloxane with the following average unit formula and a vinyl content of 1.85 weight %:

$[(CH_3)_3SiO_{1/2}]_{39.7}[(CH_3)_2(CH_2=CH)SiO_{1/2}]_{4.8}(SiO_{4/2})_{55.5},$ 1.0 part by weight of a trimethylsiloxy-endblocked methylhydrogensiloxane-dimethylsiloxane copolymer with a viscosity of 5 centipoise (0.005 Pa.s) and a molar ratio of methylhydrogensiloxane: dimethylsiloxane units of 5:3 and a silicon-bonded hydrogen content of 0.73 weight %; 0.2 part by weight of a chloroplatinic acid/divinyltetramethyl-disiloxane complex exhibiting a platinum content of 0.5 weight %; and 0.6 part by weight of 3-phenyl-1-butyn-3-ol. The properties of the silicone gel obtained by curing this composition were measured by the methods described above, and the results are reported in Table 1.

COMPARATIVE EXAMPLE 1

For comparative purposes an organosiloxane composition outside the scope of the present invention that did not contain the organosiloxane copolymer referred to as ingredient B was prepared blending the following ingredients to homogeneity: 50.0 parts by weight dimethylvinylsiloxy-endblocked dimethylpolysiloxane exhibiting a viscosity of 400 centipoise (0.4 Pa.s) and a vinyl content of 0.48 weight %; 50.0 parts by weight of a dimethylvinylsiloxy-endblocked dimethylpolysiloxane exhibiting a viscosity of 2,000 centipoise (2 Pa.s) and a vinyl content of 0.23 weight %; 0.8 part by weight of a trimethylsiloxy-endblocked methylhydrogensiloxane-dimethylsiloxane copolymer with a viscosity of 5 centipoise (0.005 Pa.s), a molar ratio of methylhydrogensiloxane:dimethylsiloxane units of 5:3 and a silicon-bonded hydrogen content of 0.73 weight %; 0.2 part by weight of a chloroplatinic acid/divinyltetramethyldisiloxane complex containing 0.5 weight % of platinum, and 0.5 weight part 3-phenyl-1-butyn-3-ol.

The properties of the silicone gel obtained by curing this composition were measured by the methods described above, and the results are reported in Table 1.

COMPARATIVE EXAMPLE 2

A comparative organosiloxane composition outside the scope of the present invention based on a molar ratio of silicon-bonded hydrogen atoms to vinyl radicals above the present limit was prepared by blending the following ingredients to homogeneity: 45.5 parts by weight of a dimethylvinylsiloxy-endblocked dimethylpolysiloxane exhibiting a viscosity of 400 centipoise (0.4 Pa.s) and a vinyl content of 0.48 weight %; 54.5 parts by weight of a dimethylvinylsiloxy-endblocked dimethylpolysiloxane exhibiting a viscosity of 2,000 centipoise (2 Pa.s) and a vinyl content of 0.23 weight percent; 13.6 parts by weight of an organopolysiloxane with the following average unit formula and a vinyl content of 1.85 weight %:

$[(CH_3)_3SiO_{1/2}]_{39.7}[(CH_3)_2(CH_2=CH)SiO_{1/2}]_{4.8}(SiO_{4/2})_{55.5}$;

4.5 parts by weight of a trimethylsiloxy-endblocked methylhydrogensiloxane-dimethylsiloxane copolymer with a viscosity of 5 centipoise and a molar ratio of methylhydrogensiloxane: dimethylsiloxane units of 5:3 and a silicon-bonded hydrogen content of 0.73 weight %; 0.2 part by weight of a chloroplatinic acid/divinyltetramethyldisiloxane complex containing 0.5 weight % of platinum; and 0.6 part by weight of 3-phenyl-1-butyn-3-ol. The properties of the silicone gel obtained by curing this composition were measured by the methods described above, and the results are reported in Table 1. Due to cracking in the quartz cell after the high-temperature treatment, the corresponding visible light transmittance value of the cured gel could not be measured.

COMPARATIVE EXAMPLE 3

A comparative organosiloxane composition containing an organohydrogensiloxane outside the scope of the present invention was prepared by mixing the following ingredients to homogeneity: 78.7 parts by weight of a dimethylvinylsiloxy-endblocked dimethylpolysiloxane exhibiting a viscosity of 400 centipoise (0.4 Pa.s) and a vinyl content of 0.48 weight %; 21.3 parts by weight of a dimethylvinylsiloxy-endblocked dimethylpolysiloxane exhibiting a viscosity of 2,000 centipoise (2 Pa.s) and a vinyl content of 0.23 weight %; 5.3 parts by weight of an organopolysiloxane with the following average unit formula and containing 1.85 weight % of vinyl radicals:

$[(CH_3)_3SiO_{1/2}]_{39.7}[(CH_3)_2(CH_2=CH)SiO_{1/2}]_{4.8}(SiO_{4/2})_{55.5}$;

15.2 parts by weight of a dimethylhydrogensiloxy-endblocked dimethylpolysiloxane with a viscosity of 16 centipoise (0.016 Pa.s) and a silicon-bonded hydrogen content of 0.13 weight %; 0.3 part by weight of a chloroplatinic acid/divinyltetramethyldisiloxane complex containing 0.5 weight % of platinum; and 0.6 part by weight of 3-phenyl-1-butyn-3-ol.

The properties of the silicone gel obtained by curing this composition were measured by the methods described above, and the results are reported in Table 1.

TABLE 1

|  | Present Invention | | | Comparative Examples | | |
| --- | --- | --- | --- | --- | --- | --- |
|  | Ex. 1 | Ex. 2 | Ex. 3 | Comp. Ex. 1 | Comp. Ex. 2 | Comp. Ex. 3 |
| SiH/SiCH=CH2 Molar Ratio Immediately After Curing | 0.4 | 0.3 | 0.3 | 0.4 | 1.5 | 1.0 |
| ¼ Scale Cone Penetration | 40 | 60 | 82 | 85 | 6 | 48 |
| Color | C/T | C/T | C/T | C/T | C/T | C/T |
| Visible Light Transmittance (%) Following Heating | 99 | 100 | 99 | 99 | 99 | 99 |
| ¼ Scale Cone Penetration | 38 | 55 | 75 | 70 | 5 | 45 |
| Color | C/T | C/T | C/T | YB/T | Y/T | Y/T |
| Visible Light Transmittance (%) | 98 | 98 | 98 | 52 | NM | 56 |
| Thermal Shock Resistance | E | E | E | E | NM | E |

Notes:
C = Colorless;
T = Transparent;
Y = Yellow;
YB = Yellowish Brown;
E = Excellent;
NM = Not measurable due to cracking.

That which is claimed is:

1. A curable organosiloxane composition comprising (A) 100 parts by weight of a first diorganopolysiloxane containing at least 1 silicon-bonded alkenyl radical in each molecule and exhibiting a viscosity at 25° C. of 50 to 100,000 centipoise (0.05 to 100 Pa.s), (B) 1 to 50 parts by weight of an organosiloxane with the average formula $(R^1_3SiO_{1/2})_a(R^1_2R^2SiO_{1/2})_b(SiO_{4/2})_c$ wherein $R^1$ represents monovalent hydrocarbon groups excluding alkenyl groups, $R^2$ represents alkenyl groups, a is 0 or a positive number, b is a positive number, c is a positive number, and the value of (a+b)/c is 0.6 from to 4.0, inclusive;

(C) a second diorganopolysiloxane exhibiting a viscosity at 25° C. of from 1 to 1,000,000 centipoise (0.001 to 1000 Pa.s) and containing at least two silicon-bonded hydrogen atoms per molecule, wherein said hydrogen atoms are present only on non-terminal silicon atoms in each molecule and the molar ratio of silicon-bonded hydrogen atoms to alkenyl radicals in ingredients A and B is from 0.1:1 to 1.2:1, inclusive; and (D) a quantity of a platinum compound sufficient to promote curing of said composition; wherein the organosiloxane gel resulting from the curing of said composition is optically clear and exhibits a one-quarter scale cone penetration value of from 20 to 200, inclusive when measured in accordance with Japanese Industrial Standard K 2220.

2. A composition according to claim 1 wherein said organosiloxane gel exhibits no discoloration or loss of transparency during seven days at a temperature of 120° C.

3. A composition according to claim 1 wherein the viscosity of said first diorganopolysiloxane is from 100 to 50,000 centipoise (0.1–50 Pa.s); $R^1$ is methyl or phenyl, $R^2$ is selected from the group consisting of vinyl, allyl, butenyl, pentenyl, hexenyl, and heptenyl; the concentration of said organosiloxane is from 10 to 50 parts by weight per 100 parts by weight of said first organopolysiloxane; the viscosity of said second diorganopolysiloxane is from 3 to 10,000 centipoise (0.003 to 10 Pa.s); the molar ratio of silicon-bonded hydrogen atoms to alkenyl radicals in ingredients A and B is from 0.1 to 0.5, inclusive; the concentration of said platinum compound is equivalent to from 0.01 to 1,000 parts by weight of platinum metal per one million weight parts of the combination of (A), (B) and (C); said one-quarter scale cone penetration value is from 30 to 150; and said gel remains optically transparent following exposure to 120° C.

4. A composition according to claim 3 wherein $R^1$ is methyl, $R^2$ is vinyl, said first diorganopolysiloxane is a vinyl-substituted dimethylpolysiloxane and said second diorganopolysiloxane is a dimethylpolysiloxane containing at least two silicon-bonded hydrogen atoms per molecule.

* * * * *